(12) United States Patent
Oami et al.

(10) Patent No.: US 11,120,838 B2
(45) Date of Patent: Sep. 14, 2021

(54) INFORMATION PROCESSING APPARATUS, CONTROL METHOD, AND PROGRAM

(71) Applicants: NEC CORPORATION, Tokyo (JP); NEC Solution Innovators, Ltd., Tokyo (JP)

(72) Inventors: Ryoma Oami, Tokyo (JP); Tetsuaki Suzuki, Tokyo (JP); Yusuke Takahashi, Singapore (SG)

(73) Assignees: NEC CORPORATION, Tokyo (JP); NEC Solution Innovators, Ltd., Tokyo (JP)

( * ) Notice: Subject to any disclaimer, the term of this patent is extended or adjusted under 35 U.S.C. 154(b) by 0 days.

(21) Appl. No.: 16/634,443

(22) PCT Filed: Jun. 1, 2018

(86) PCT No.: PCT/JP2018/021218
§ 371 (c)(1),
(2) Date: Jan. 27, 2020

(87) PCT Pub. No.: WO2019/021628
PCT Pub. Date: Jan. 31, 2019

(65) Prior Publication Data
US 2021/0090611 A1 Mar. 25, 2021

(30) Foreign Application Priority Data
Jul. 28, 2017 (JP) .............................. JP2017-146636

(51) Int. Cl.
*H04N 7/18* (2006.01)
*H04N 5/77* (2006.01)
(Continued)

(52) U.S. Cl.
CPC .......... *G11B 27/19* (2013.01); *G06K 9/00744* (2013.01); *G11B 27/005* (2013.01); *G06K 9/00771* (2013.01)

(58) Field of Classification Search
USPC .......... 386/228, 278, 280, 239; 348/169, 61, 348/129
See application file for complete search history.

(56) References Cited

U.S. PATENT DOCUMENTS 7,623,756 B2 * 11/2009 Komori ................ G11B 27/105
386/343
8,908,042 B2 * 12/2014 Ohkawa .................... G06T 1/00
348/153
(Continued)

FOREIGN PATENT DOCUMENTS

| CN | 101552910 A | 10/2009 |
|---|---|---|
| JP | 2010-258704 A | 11/2010 |

(Continued)

OTHER PUBLICATIONS

International Search Report for PCT/JP2018/021218 dated Aug. 21, 2018 [PCT/ISA/210].
(Continued)

*Primary Examiner* — Daquan Zhao
(74) *Attorney, Agent, or Firm* — Sughrue Mion, PLLC

(57) ABSTRACT

An information processing apparatus (2100) detects a left-behind object from video data (12). In addition, the information processing apparatus (2100) estimates a time-point at which the left-behind object is left behind. Furthermore, the information processing apparatus (2100) acquires video data near an estimated left-behind time-point (estimated left-behind time-point), controls the acquired video data based on the estimated left-behind time-point, and then presents at least a part of the acquired video data to a user.

17 Claims, 9 Drawing Sheets

(51) Int. Cl.
H04N 5/93 (2006.01)
G11B 27/00 (2006.01)
G11B 27/19 (2006.01)
G06K 9/00 (2006.01)
H04N 5/225 (2006.01)

(56) References Cited

U.S. PATENT DOCUMENTS

| | | |
|---|---|---|
| 2010/0271478 A1 | 10/2010 | Oya |
| 2011/0090358 A1* | 4/2011 | Tojo .................. G06K 9/00771 |
| | | 348/222.1 |
| 2012/0308194 A1 | 12/2012 | Fujiwara |
| 2015/0208058 A1 | 7/2015 | Denizot et al. |
| 2016/0078296 A1 | 3/2016 | Tojo |
| 2016/0323536 A1 | 11/2016 | Oya |
| 2017/0236010 A1 | 8/2017 | Tojo |

FOREIGN PATENT DOCUMENTS

| | | |
|---|---|---|
| JP | 2011-049646 A | 3/2011 |
| JP | 2011-087253 A | 4/2011 |
| JP | 2012-217056 A | 11/2012 |
| JP | 2012-235300 A | 11/2012 |
| JP | 2012-253559 A | 12/2012 |
| JP | 2017-117349 A | 6/2017 |

OTHER PUBLICATIONS

Singaporean Office Acton for SG Application No. 11202000466P dated Jan. 13, 2021.

* cited by examiner

INFORMATION PROCESSING APPARATUS, CONTROL METHOD, AND PROGRAM

CROSS REFERENCE TO RELATED APPLICATIONS

This application is a National Stage of International Application No. PCT/JP2018/021218 filed Jun. 1, 2018, claiming priority based on Japanese Patent Application No. 2017-146636 filed Jul. 28, 2017, the entire disclosure of which is incorporated herein.

TECHNICAL FIELD

The present invention relates to an information processing apparatus, a control method, and a program.

BACKGROUND ART

A technique for analyzing an image captured by a surveillance camera to detect a suspicious object is being developed. For example, Patent Document 1 and Patent Document 2 disclose techniques for detecting an object whose state is continuously stationary as a suspicious object being left, and presuming a person who left the object.

RELATED DOCUMENT

Patent Document
[Patent Document 1] Japanese Patent Application Publication No. 2011-049646
[Patent Document 2] Japanese Patent Application Publication No. 2012-235300

SUMMARY OF THE INVENTION

Technical Problem

In Patent Document 1 and Patent Document 2 described above, an object being continuously stationary is detected as an object being left. However, the object being continuously stationary is not always corresponding to the object being left. For example, there is a case where a customer waiting for a target plane in the lobby of the airport continually sits on a chair in a state of placing luggage in their vicinity. In a case where the object being continuously stationary is detected as the object being left, luggage is also falsely detected as the object being left.

Note that, in Patent Document 1, there is disclosed a technique in which an object in vicinity of a moving object is not detected as an object being left, so that the object which is merely left on a side of the moving object is not detected as a suspicious object. However, in the method, in a case where the owner of the luggage does not move as in a case of the owner continually sifting on the chair with the luggage that is put beside their feet as described above, the luggage is falsely detected as an object being left.

In addition, neither patent document clearly describes an alert confirmation method. Furthermore, even though an object being left is only displayed to be enclosed in a rectangle, it is difficult to easily grasp information such that how and who has left the object.

The present invention is made in view of the above circumstances. An object of the present invention is to provide a technique capable of easily grasping a situation in which an object has been left after detecting the object being left.

Solution to Problem

An information processing apparatus of the present invention includes 1) a left-behind object detection unit detecting a left-behind object from video data, 2) a left-behind time-point estimation unit estimating a left-behind time-point at which the left-behind object is placed, and 3) a presentation control unit acquiring video data near the estimated left-behind time-point, and controlling a method of presenting the acquired video data based on the estimated left-behind time-point to present at least a part of the acquired video data.

A control method according to the present invention causes a computer to execute 1) a left-behind object detection step of detecting a left-behind object from video data, 2) a left-behind time estimation step of estimating a left-behind time-point at which the left-behind object is placed, and 3) a presentation control step of acquiring video data near the estimated left-behind time-point, and controlling a method of presenting the acquired video data based on the estimated left-behind time-point to present at least a part of the acquired video data.

A program according to the present invention causes a computer to execute each step of the control method according to the present invention.

ADVANTAGEOUS EFFECTS OF INVENTION

According to the present invention, there is provided a video providing method of easily grasping a state of an object left behind such that how and who has left the object.

BRIEF DESCRIPTION OF THE DRAWINGS

The above-described object, other objects, features, and advantages will be further clearly described through preferable embodiments described below and accompanying drawings below.

DESCRIPTION OF EMBODIMENTS

Hereinafter, embodiments of the present invention will be described with reference to the accompanying drawings.

Also, in all drawings, the same components are denoted to the same symbols, and description is appropriately not repeated. In addition, unless particularly described, each block in respective block diagram represents a configuration in function units instead of a configuration in hardware units.

First Example Embodiment

<Outline>

Described is a method of detecting a left-behind object, specifically detecting a stationary object from video data and treating the stationary object as a left-behind object. As a method of detecting the stationary object, there is a method of detecting an object as a stationary object in a case where the object is detected from each video frame constituting video data, and stationary. Here, "the object is stationary" means that a change of the position of the object continues to be small (a value less than a predetermined threshold) is continuous. Therefore, when a change of the position of an object continues to be small, that object is detected as a stationary object.

However, the left-behind object is detected a certain period of time after a time-point at which the object is left behind, and a person who left the object is not captured in the same frame. Therefore, it is difficult to immediately grasp that how and who has left the object.

Figure 1:
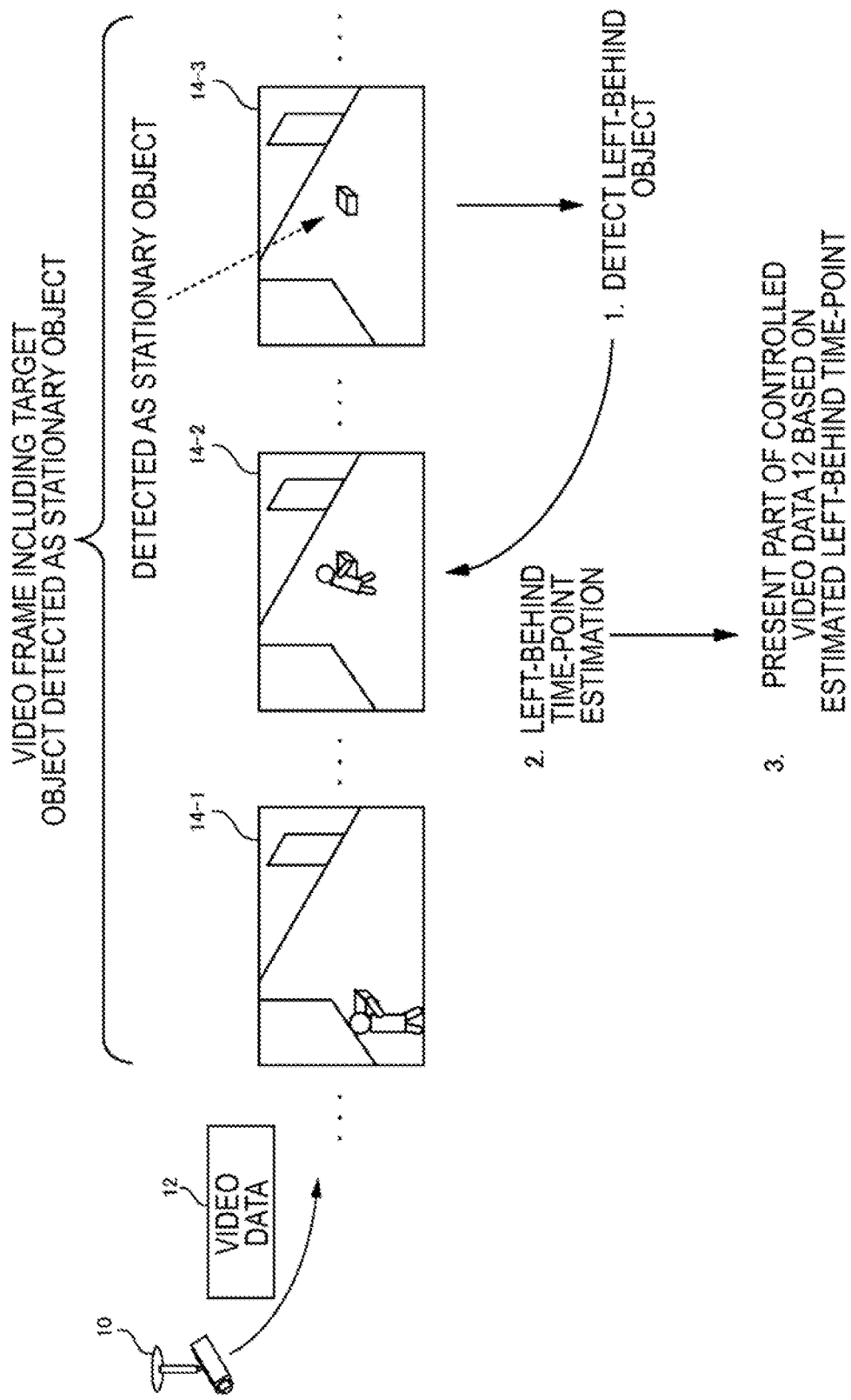
FIG. 1 is a diagram illustrating an outline of an operation of an information processing apparatus according to a present example embodiment.

Accordingly, an information processing apparatus of the present example embodiment performs further processing in a case where the left-behind object is detected from the video data. FIG. 1 is a diagram illustrating an outline of an operation of the information processing apparatus (information processing apparatus 2100 in FIG. 2 described later) of the present example embodiment. FIG. 1 is an example for ease of understanding about the information processing apparatus 2100, and the operation of the information processing apparatus 2100 is not limited thereto.

The information processing apparatus 2100 detects the left-behind object from video data 12. Furthermore, the information processing apparatus 2100 estimates a time-point at which a stationary object is left behind. Hereinafter, the left-behind time-point that is estimated is referred to as estimated left-behind time-point. Then, the information processing apparatus 2100 provides images (still images or video) near the estimated left-behind time-point in the video data 12. Here, "near the estimated left-behind time-point" means being close to the estimated left-behind time-point. For example, "near the estimated left-behind time-point" means being included in a period from a time-point that is predetermined time before the estimated left-behind time-point and a time-point that is predetermined time after the estimated left-behind time-point.

Here, the information processing apparatus 2100 controls a method of presenting an image based on the estimated left-behind time-point. As described later, examples of processing of controlling an image presentation include processing of performing a playback of the video data 12 at a different velocity so that the video data 12 near the estimated left-behind time-point is subjected to a playback at a slower playback speed than video data 12 in other periods, and processing of presenting still images by separating the video data 12 near the estimated left-behind time-point wherein still images near the estimated left-behind time-point are displayed by extracting them denser than still images in other periods.

According to the information processing apparatus 2100 of the present example embodiment, an image near the estimated left-behind time-point is presented in a manner in which the image is controlled based on the estimated left-behind time-point. It is possible to easily grasp a situation in which the left-behind object is left behind by observing the provided images.

Hereinafter, the information processing apparatus 2100 of the present example embodiment will be described in further detail. <Example of Functional Configuration of information processing apparatus 2100>

Figure 2:
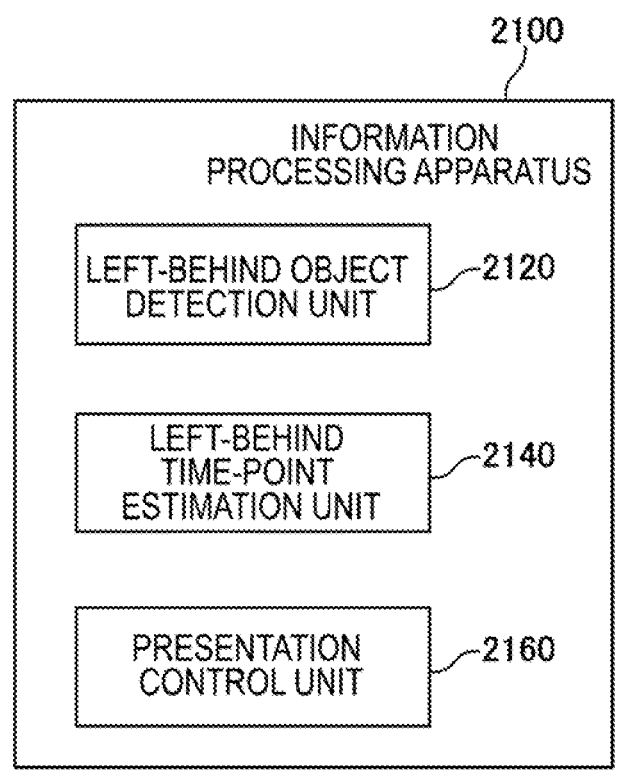
FIG. 2 is a diagram illustrating a configuration of the information processing apparatus according to a first example embodiment.

FIG. 2 is a diagram illustrating a configuration of the information processing apparatus 2100 according to a first example embodiment. The information processing apparatus 2100 includes a left-behind object detection unit 2120, a left-behind time-point estimation unit 2140, and a presentation control unit 2160. The left-behind object detection unit 2120 detects a left-behind object from the video data 12. The left-behind time-point estimation unit 2140 estimates a left-behind time-point which is a time-point at which an object (target object) detected as a left-behind object is left behind. The presentation control unit 2160 acquires the video data 12 near the left-behind time-point that is estimated (that is, the estimated left-behind time-point), and presents at least a part of the acquired video data 12. This presentation is controlled based on the estimated left-behind time-point.

<Hardware Configuration of Information Processing Apparatus 2100>

Each functional component of the information processing apparatus 2100 may be realized by hardware (for example, a hard-wired electronic circuit or the like) which realizes each functional component, or may be realized through a combination of hardware and software (for example, a combination of an electronic circuit and a program controlling the electronic circuit, or the like). Hereinafter, a case where each functional component of the information processing apparatus 2100 is realized through the combination of hardware and software will be further described.

Figure 3:
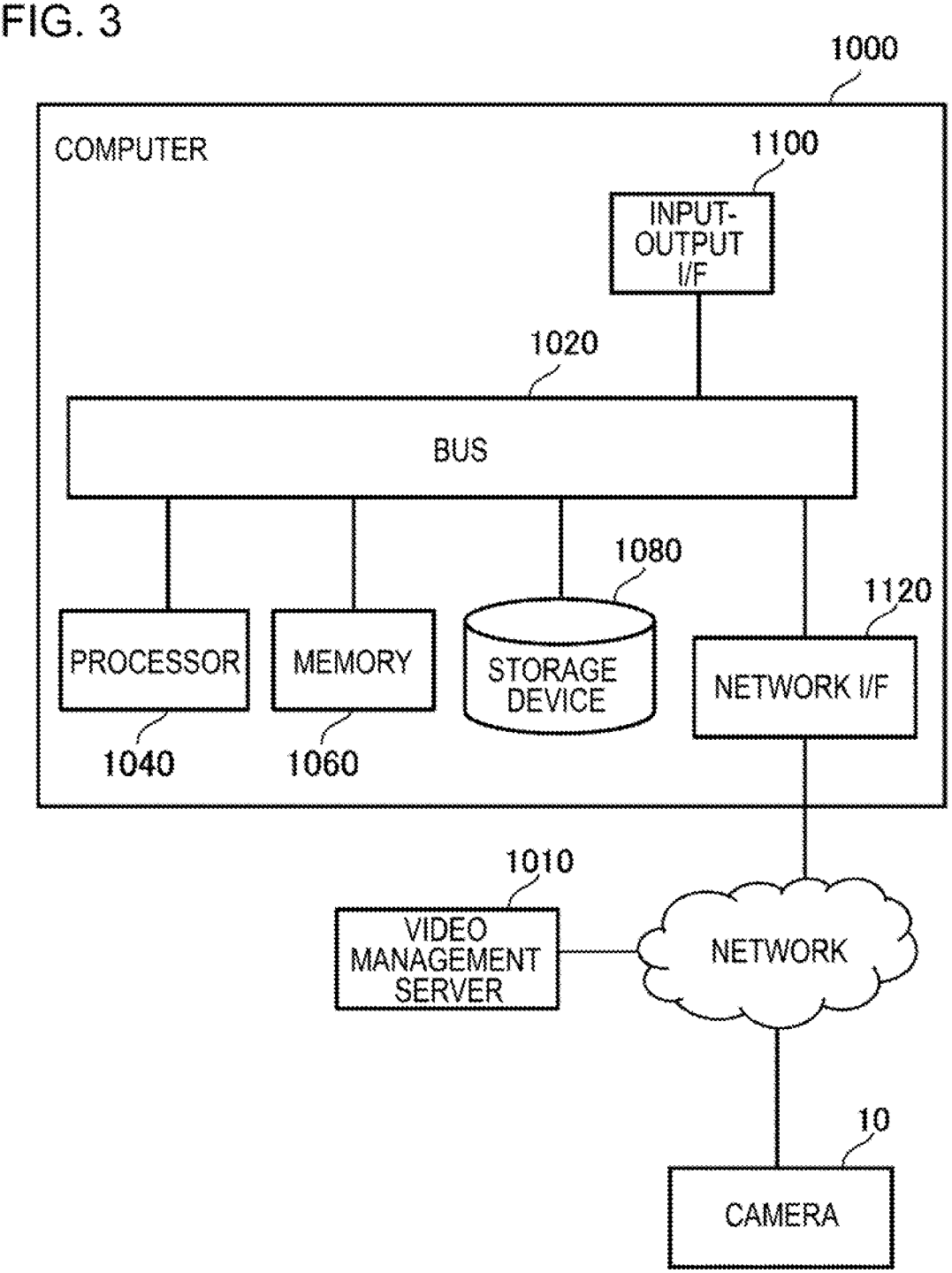
FIG. 3 is a diagram illustrating a computer which is used to realize the information processing apparatus.

FIG. 3 is a diagram illustrating a computer 1000 which is used to realize the information processing apparatus 2100. The computer 1000 is an optional computer. For example, the computer 1000 includes a personal computer (PC), a server machine, a tablet terminal, a smartphone, or the like. The computer 1000 may be a dedicated computer which is designed to realize the information processing apparatus 2100, or a general-purpose computer.

The computer 1000 includes a bus 1020, a processor 1040, a memory 1060, a storage device 1080, an input-output interface 1100, and a network interface 1120. The bus 1020 is a data transmission line which is used for the processor 1040, the memory 1060, the storage device 1080, the input-output interface 1100, and the network interface 1120 to transmit and receive data to and from each other. However, a method of connecting the processor 1040 and the like to each other is not limited to bus connection. The processor 1040 is an arithmetic unit such as central processing unit (CPU) or graphics processing unit (GPU). The memory 1060 is a main storage device which is realized by using random access memory (RAM) or the like. The storage device 1080 is an auxiliary storage device which is realized by using hard disk, solid state drive (SSD), memory card, read only memory (ROM), or the like. However, the storage device 1080 may include hardware which is the same as hardware, such as RAM, included in the main storage device.

The input-output interface 1100 is an interface which is used to connect the computer 1000 to an input-output device. The network interface 1120 is an interface which is used to connect the computer 1000 to a communication network. The communication network is, for example, local area network (LAN) or wide area network (WAN). A method of connecting to the communication network via the network interface 1120 may be wireless connection or wired connection.

For example, the computer 1000 is communicably connected to a camera 10 or a video management server 1010 through the network. However, a method of communicably connecting the computer 1000 to the camera 10 or the video management server 1010 is not limited to connection through the network. In addition, the computer 1000 may not be communicably connected to the camera 10.

The storage device 1080 stores a program module for realizing each functional component (the left-behind object detection unit 2120, the left-behind time-point estimation unit 2140, and the presentation control unit 2160) of the information processing apparatus 2100. The processor 1040 realizes functions corresponding to each program module by reading out into the memory 1060 so as to execute each program module.

Note that, the computer 1000 may be realized using a plurality of computers. For example, the left-behind object detection unit 2120, the left-behind time-point estimation unit 2140, and the presentation control unit 2160 can be realized by different computers respectively. In this case, the program modules stored in the storage device of each computer may be only the program modules corresponding to the functional components realized by the computers.

<Camera 10>

The camera 10 is an arbitrary camera which can generate video data 12 by repeatedly performing imaging. For example, the camera 10 is a surveillance camera provided to monitor a specific facility or a road.

A part or all of functions of the information processing apparatus 2100 may be realized by the camera 10. That is, the camera 10 may be used as the computer 1000 for realizing the information processing apparatus 2100. Furthermore, function of the video management server 1010 may also be included in the camera 10. In this case, the camera 10 stores and processes the video data 12 generated by itself. It is possible to use cameras, for example, an intelligent camera, a network camera, or a camera which is called interne protocol (IP) camera and the like, as the camera 10 used to realize the information processing apparatus 2100.

<Regarding Video Management Server 1010>

The video management server 1010 is communicably connected to the camera 10 and the computer 1000, and has function of storing the video data 12 generated by the camera 10 and distributing the video data 12 in response to a request. In a case where there is a distribution request for the video data 12 from the computer 1000, the video data 12 at a specified time among the video data 12 generated by the camera 10 is distributed to the computer 1000. In this case, the computer 1000 may acquire and process the video data 12 from the camera 10 directly. Alternatively, the video data 12 acquired by the camera 10 may be stored in the video management server 1010 and the computer 1000 may access the video management server to acquire and process the video data 12.

The video management server 1010 may be realized using the computer 1000 together with the information processing apparatus 2100. In this case, the information processing apparatus 2100 and the video management server 1010 exchange data with each other via the bus 1020.

<Flow of Processing>

Figure 4:
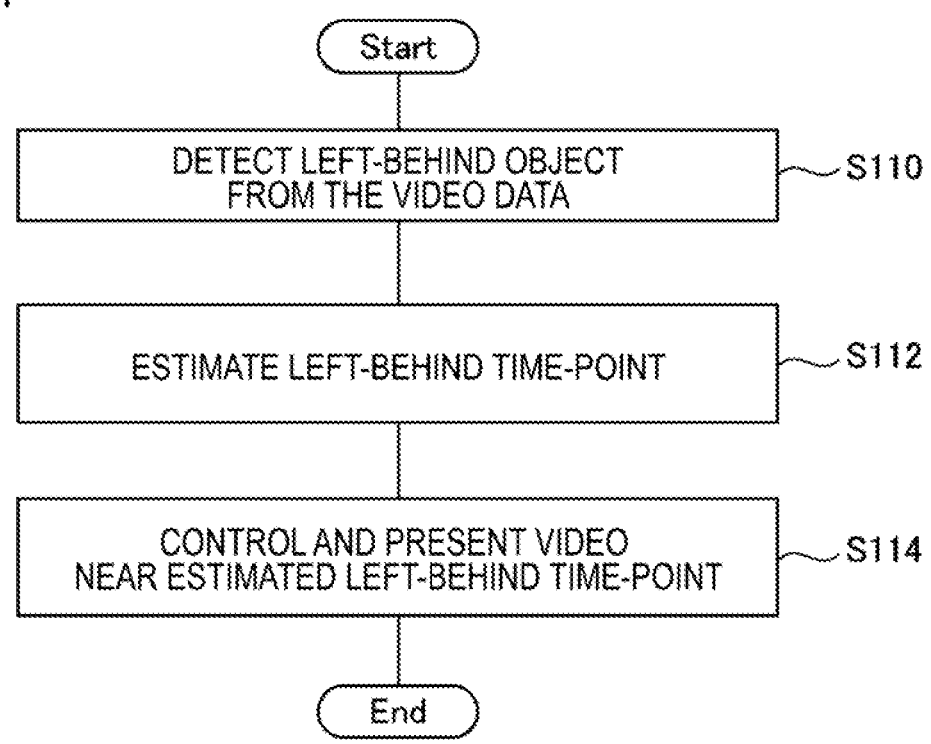
FIG. 4 is a flowchart illustrating a flow of a process executed by the information processing apparatus according to the first example embodiment.

FIG. 4 is a flowchart illustrating a flow of processing executed by the information processing apparatus 2100 according to the first example embodiment. The left-behind object detection unit 2120 detects an object being left from the video data 12 (S110). The left-behind time-point estimation unit 2140 estimates the left-behind time-point at which the object is left behind based on a time-point at which the object is detected (S112). The presentation control unit 2160 acquires the video data 12 near the estimated left-behind time-point, and controls and provides the video data 12 based on the estimated left-behind time-point (S114).

<Method of Acquiring Video Data 12>

The information processing apparatus 2100 acquires video data 12 to be processed. There are various methods of acquiring the video data 12 by the information processing apparatus 2100. For example, the information processing apparatus 2100 receives the video data 12 transmitted from the camera 10. In addition, for example, the information processing apparatus 2100 accesses the camera 10 and acquires the video data 12 stored in the camera 10.

The video data 12 generated by the camera 10 is also transmitted to the video management server 1010, where the video data 12 is stored.

Note that, the video data 12 generated by the camera 10 may be stored in the video management server 1010, and then the stored video data 12 may be read out from the computer 1000 and subjected to processing.

In a case where a part or all of functions of the information processing apparatus 2100 is realized by the camera 10, the information processing apparatus 2100 acquires the video data 12 which are generated by the information processing apparatus 2100 itself. In this case, the video data 12 are stored in, for example, the storage device (for example, the storage device 1080) which is implemented inside the information processing apparatus 2100. Therefore, the information processing apparatus 2100 acquires the video data 12 from the storage device.

The timing at which the information processing apparatus 2100 acquires the video data 12 is arbitrary. For example, each time when new video frames 14 constituting the video data 12 are generated by the camera 10, the information processing apparatus 2100 acquires the video data 12 by acquiring the newly generated video frames 14. In addition, for example, the information processing apparatus 2100 may periodically acquire video frames 14 that remain to be acquired. For example, in a case where the information processing apparatus 2100 acquires the video frames 14 once a second, the information processing apparatus 2100 collectively acquires a plurality of video frames 14 (for example, in a case where a frame rate of the video data 12 is 30 frames/second (fps), the number of video frames 14 is 30) generated during one second.

The left-behind object detection unit 2120 may acquire all the video frames 14 constituting the video data 12 or may acquire only a part of the video frames 14. In the latter case, for example, the left-behind object detection unit 2120 acquires the video frame 14 generated by the camera 10 at a ratio of one frame per a predetermined number of frames.

<Detection of Left-behind Object: S110>

The left-behind object detection unit 2120 detects the stationary object from the video data 12 and determines the stationary object as a left-behind object (S110). Conventional technique can be used as the technique for detecting the stationary object from the video data. Note that, an example in which the stationary object is considered as the left-behind object is described here, but the detection of the left-behind object is not limited thereto. A method of detecting the left-behind object with higher accuracy will be described later. Hereinafter, an example of a method of detecting the stationary object from the video data 12 will be described.

The left-behind object detection unit 2120 detects an object from each video frame 14 constituting the video data 12. The left-behind object detection unit 2120 computes a variation amount of a position of the object for each of the plurality of video frames 14 which includes the same object. The left-behind object detection unit 2120 detects an object as the stationary object in a case where a state in which the variation amount of the position of the object is equal to or less than a predetermined amount continues for a predetermined period. Here, in a case where an object is detected as the stationary object by the left-behind object detection unit 2120, the predetermined period when the state in which the variation amount of the position of the object is equal to or less than a predetermined amount continues is referred to as a stationary determination period.

Figure 5:
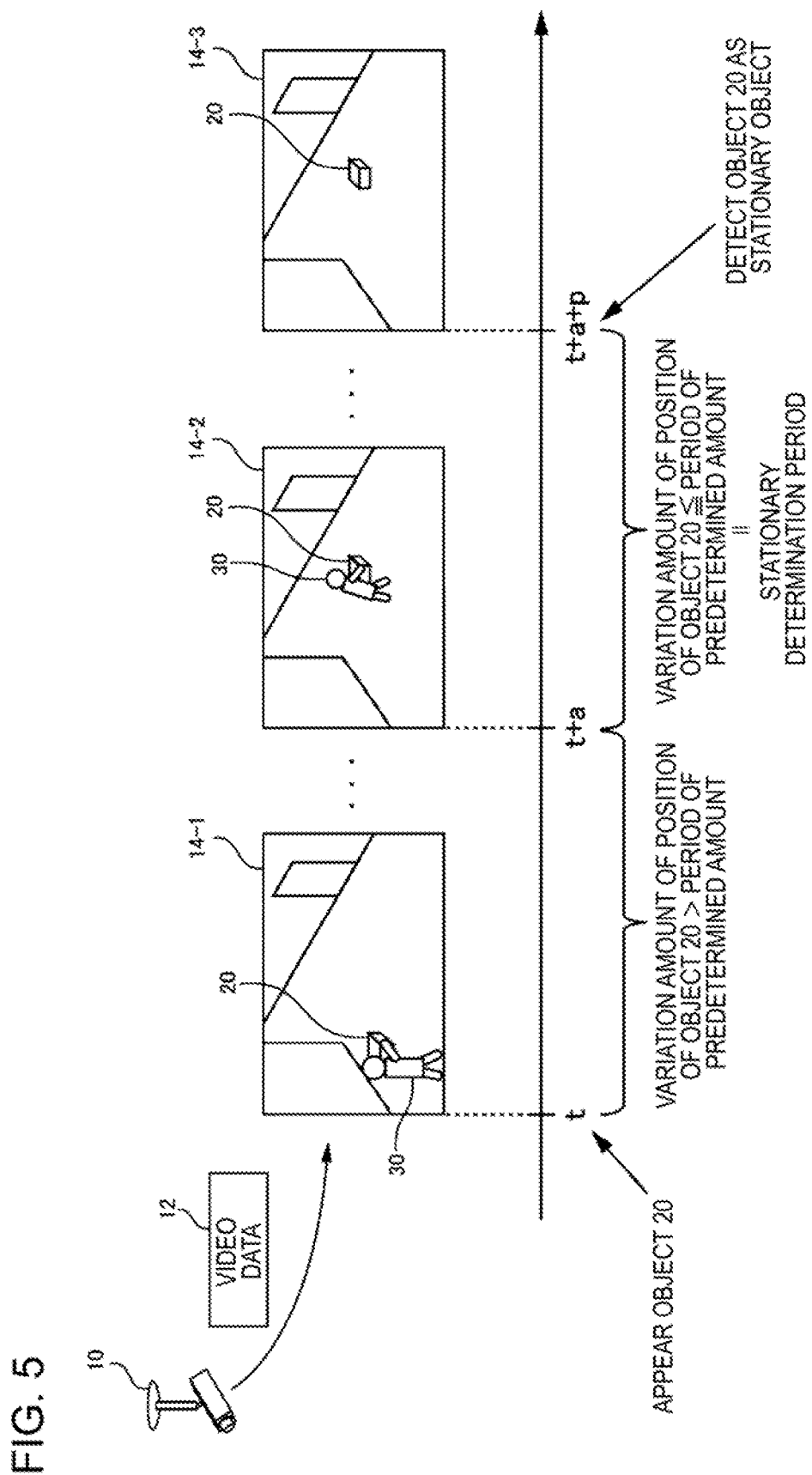
FIG. 5 is a diagram conceptually illustrating a method of detecting a stationary object from video data.

FIG. 5 is a diagram conceptually illustrating a method of detecting the stationary object from the video data 12. In this example, the stationary object detection unit 2020 detects an object as the stationary object in a case where the period when the variation amount of the position of the object is equal to or less than a predetermined value is equal to or more than p.

In the video data 12 illustrated in FIG. 5, an object 20 is detected from each video frame 14 after the time-point t. The stationary object detection unit 2020 computes a variation amount of a position of the object 20 by computing the difference in the positions of the object 20 for each combination of two video frames 14 adjacent to each other in time series.

First, at the time-point t, a person 30 holding the object 20 appears. The person 30 is moving with the object 20 until the time-point t+a. Therefore, any variation amount of the position of the object 20 computed for a period from the time-point t to the time-point t+a has a value larger than the predetermined amount. As a result, in the determination obtained by using the video frames 14 generated in the period, the object 20 is not detected as the stationary object.

Then, after the time-point t+a, the object 20 is being placed on the ground. Therefore, any variation amount of the position of the object 20 detected from each video frame 14 after the time-point t+a is equal to or less than the predetermined amount. Accordingly, the left-behind object detection unit 2120 detects the object 20 as the stationary object based on the determination obtained by using the video frames 14 generated in the period from the time-point t+a to the time-point t+a+p.

In addition, for example, the left-behind object detection unit 2120 may generate a background image (an image constituted of only background) using the video frame 14 and may detect the stationary object based on the background subtraction. First, the left-behind object detection unit 2120 generates a background image from the video frames 14 in the time-series. Various known techniques can be used to generate the background image. Next, the left-behind object detection unit 2120 computes the difference between a newly acquired video frame 14 and the background image. Then, the left-behind object detection unit 2120 extracts a region in which the difference is large. The left-behind object detection unit 2120 executes the above described processing each time when the video frame 14 is acquired, compares acquired extraction results between the frames, and determines whether or not the variation amount of the position of the object is within the predetermined amount.

In the case of FIG. 5, it is assumed that the above described background subtraction is used. In this case, the variation amount of the position of the object 20 computed for the period from the time-point t to the time-point t+a has a value greater than the predetermined amount. On the other hand, after the time-point t+a, the variation amount of the position of the object 20 is equal to or less than the predetermined amount. Therefore, even in a case of using the background subtraction, the object 20 is detected as the stationary object based on the determination obtained by using the video frames 14 that is generated in the period from the time-point t+a to the time-point t+a+p. Note that, the background image used for the background subtraction may be plural. For example, the information processing apparatus 2100 is configured to compute the background subtraction by using the background images created at a plurality of time periods to determine the stationary object, as described in Patent Document WO2014/192441.

Note that, a method of determining a movement of the object is not limited to the above method. For example, various methods can be used such as a method of "extracting feature points in an object and correlating the feature points between frames adjacent to each other to obtain a movement amount of the object".

<Estimation of Left-behind Time-Point: S112>

Next, the left-behind time-point estimation unit 2140 estimates a time-point at which the object is left behind (S112). As described above, in a case where a stationary object is detected as a left-behind object, the object is detected as a stationary object after a predetermined time has elapsed since the object is in a state of stationary. Therefore, basically, a time-point t+a obtained by subtracting the stationary determination period p from a detection time-point t+a+p is the estimated left-behind time-point. However, a time-point t+a may not always be an accurate left-behind time-point. This is because, in a case where a place where people come and go is imaged by the camera 10, a time-point at which the target object is determined to be stationary does not always coincide with a time-point at which the target object is actually left behind. Therefore, the left-behind time-point estimation unit 2140 may search the video data 12 ahead of and behind time-points so as to obtain the estimated left-behind time-point.

For example, the left-behind time-point estimation unit 2140 extracts a feature value of the same region as a stationary object region detected at the time-point t+a+p from a frame at the time-point t+a. In addition, the left-behind time-point estimation unit 2140 extracts the feature value of the same region in the background image. In a case where the feature value extracted from the frame at the time-point t+a can be regarded as the same feature value of the background (for example, a case where the similarity between feature values is equal to or greater than a certain value, or a distance between feature values is equal to or less than a certain value), there is high possibility that the object has not been placed at that time-point when the feature value is the same as the feature value of the background. Therefore, the left-behind time-point estimation unit 2140 may sequentially search for frames after that time-point and set a time-point at which a frame from which the feature value that is not the same as the feature value of the background is extracted is found as the estimated left-behind time-point. Conversely, in a case where the feature value is different from the feature value of the background when the feature value of the same region is extracted at the time-point t+a, there is high possibility that the object has been left behind before. Therefore, the left-behind time-point estimation unit 2140 may sequentially search for frames before that time-point and set a time-point at which a frame from which the feature value that is the same as the feature value of the background is extracted is found as the estimated left-behind time-point.

Alternatively, the left-behind time-point estimation unit 2140 extracts the feature value of the stationary object region detected at the time-point t+a+p, extracts the feature value of the same region at the time-point t+a, and compares the feature values to each other. In a case where the feature value at the time-point t+a+p and the feature value at the time-point t+a can be regarded as the same (for example, a case where the similarity between feature values is equal to or greater than a certain value, or a distance between feature values is equal to or less than a certain value), there is high possibility that the object has been placed already at that time-point when the feature values are the same. Therefore, the left-behind time-point estimation unit 2140 may sequentially search for frames before that time-point and set a time-point at which a frame in which the feature value that is not the same as the feature value at the time-point t+a+p is extracted is found as the estimated left-behind time-point. Conversely, in a case where the feature value at the time-point t+a+p and the feature value at the time-point t+a are different from each other, there is high possibility that an object has been left behind after at that time-point when the feature values are different from each other. Therefore, the left-behind time-point estimation unit 2140 may sequentially search for frames after that time-point and set a time-point at which a frame in which the feature value that is not the same as the feature value of the background is extracted is found as the estimated left-behind time-point.

<Presentation of Image: S114>

Next, the presentation control unit 2160 acquires the video data 12 near the estimated left-behind time-point from the video management server, and presents the acquired video data 12 to a user (operator) through controls so as to easily grasp the situation (S114). The method of determining "near the estimated left-behind time-point" is arbitrary. For example, as described above, "near the estimated left-behind time-point" is defined as a period being included in a period from a time-point that is predetermined time before the estimated left-behind time-point and a time-point that is predetermined time after the estimated left-behind time-point. In this case, the presentation control unit 2160 acquires each video frame from the video frame generated a predetermined time before the estimated left-behind time-point to the video frame generated a predetermined time after the estimated left-behind time-point, among the video frames configuring the video data.

The presentation control unit 2160 controls the method of presenting the image (at least a part of the acquired video data 12) based on the estimated left-behind time-point. Hereinafter, a specific example of a control method is described.

<<(1) Playback Video Near Estimated Left-behind Time-point>>

The presentation control unit 2160 acquires information regarding the video data 12 near the estimated left-behind time-point from the video management server 1010. For example, the presentation control unit 2160 acquires the video data 12 from a predetermined time before the estimated left-behind time-point to the time-point at which the left-behind object is detected. Next, the presentation control unit 2160 performs a playback and displays the video data 12. For example, a playback display is controlled by a button. In this case, the presentation control unit 2160 starts to perform the playback of the video data 12 in accordance with detecting that a predetermined button is pressed by the user. In addition, for example, the presentation control unit 2160 may automatically acquire the video data 12 and perform the playback thereof in accordance with the detected left-behind object.

At this time, it is preferable that the presentation control unit 2160 controls a playback speed for the video data 12 in accordance with a time difference between a time-point of the video data 12 at which the playback is being performed and the estimated left-behind time-point. There is high possibility that a person who has actually left the object is captured near the estimated left-behind time-point. On the other hand, since the detected object itself remains stationary from the estimated left-behind time-point to the detection time-point, visibility for the object is not easily lowered even though the playback is performed by fast-forwarding. Therefore, the presentation control unit 2160 sets the playback speed of the video data 12 at time-points close to the estimated left-behind time-point (for example, the time-point at which the difference from the estimated left-behind time-point is equal to or less than a predetermined value) is slower than a playback speed of the video data 12 in other periods. For example, the former playback speed is set to a normal playback speed or a playback speed slower than normal (for example, 0.5 times), and the latter playback speed is set to a playback speed higher than normal (for example, twice the normal playback speed). As a result, it is possible to focus on and check an important part of what kind of person has left what kind of object, and the situation at the time-point of the object left behind can be easily grasped.

In addition, in this above playback method, the playback may be performed in the reverse direction of time rather than in the forward direction of time. That is, the presentation control unit 2160 may perform the playback of the video data 12 from near the time-point at which the left-behind object is detected toward the estimated left-behind time-point (so-called a reverse playback). Thereby, each video frame is displayed in an order from a latest generation time-point. In this case, it is preferable that the video data 12 near the estimated left-behind time-point is subjected to the playback by slow-backwarding, and the video data 12 at the other time is subjected to the playback by fast-backwading. Thereby, the video data 12 can be checked focusing on the detected left-behind object, and the video data 12 may be checked by observing closely.

In a case of performing the forward playback of time, the left-behind object is not yet appeared on a screen at the first time-point. Therefore, in a case where a plurality of people are captured on the screen, it cannot be determined that which person has to be focused on and subjected to checking the video data 12. Therefore, a plurality of people need to be continuously checked at the same time, and grasping the situation is difficult.

On the other hand, in a case of performing the reverse playback of time, the object which has already been left behind is captured on the screen. Therefore, it is necessary to focus on only the person who approaches the object in the reverse direction, so that the person to be observed is narrow down. Thus, the situation is easily checked and grasped efficiently in a short time, and the person who has left the object can be determined.

<<(2) Displaying Videos Near Estimated Left-behind Time-point by Separating them into Still Images>>

As another image providing method, it is considered to separate the video data 12 into still image frames (video frames) and display the still image frames side by side on the screen. Here, "separation" means that one or more of a plurality of video frames constituting video data is extracted from the video data. In this case, density of the video frames to be separated is set to be dense near the estimated left-behind time-point (that is, a time interval between the video frames to be separated is shortened), and is set to be modest in other periods (a time interval between the video frames to be separated is longer). In other words, regarding the video data 12 near the estimated left-behind time-point, the number of video frames extracted from the video data 12 per unit time is increased, and regarding the video data 12 in other periods, the number of video frames extracted from the video data 12 per unit time is decreased. For example, regarding the video data 12 near the estimated left-behind time-point, five video frames are extracted and displayed on the screen for each video data 12 for one second, and regarding the video data 12 in other periods, one video frame is extracted and displayed on the screen for each video data 12 for one second. By controlling the density of the video frames to be separated based on the estimated left-behind time-point, it is possible to focus on the part in which the person who left the object behind is considered to be captured can be presented in the still image, and it becomes easier to grasp how and who has left the object.

In addition, in a case where the video data 12 is separated into video frames and displayed, the presentation control unit 2160 may control a size of the video frame to be displayed based on the estimated left-behind time-point. For example, the presentation control unit 2160 displays the video frame near the estimated left-behind time-point larger than the video frames in other periods. Thereby, behavior of the person near the time of the object being left becomes easy to be grasped. Note that, only one or both of controlling the number of video frames and the size there of may be performed.

<<(3) Switching Separated Video At Regular Interval To Present Picture Story Show>>

The presentation control unit 2160 may display the video frames separated from the video data 12 using the above method (2) while switching the video frames at a regular interval in a time direction instead of arranging the video frames side by side on the screen. As described in (2), in a case where the density of still images near the estimated left-behind time-point is high, near the estimated time is the same as the slow playback and the same effect as (1) is obtained when the still image is switched and displayed at equal time intervals.

Terminals used by security guards at the site may be terminals having a size not so large such as mobile terminals and augmented reality (AR) glasses. In this case, the separated video frames are controlled by the method (3) and provided, thereby efficiently conveying a situation to the security guards at the site. Furthermore, when compared to an original video data, the still image sequence selected in this way generally has a smaller data capacity. Therefore, data transmission is possible even in a communication environment with a narrow communication bandwidth. Note that, as described in (1), in this case as well, the images are switched toward the reverse direction of time (images are sequentially presented from the newest to the oldest in time), the same as the case of (1), so that the situation can be grasped more easily.

Although the three image presentation control methods are described above, in any case, the presentation control unit 2160 may superimpose or highlight other information so that the situation can be easily visually confirmed. For example, in a case of providing an image, it is considered to display a target object by enclosing the target object with a frame. In this case, the presentation control unit 2160 may flicker the frame. In addition, the presentation control unit 2160 may alert the user by changing color of the frame, thickness of the frame, flickering the frame, or generating sound near the detection time of the object being left.

Otherwise, the presentation control unit 2160 may display information (hereinafter, object information) regarding a target object collectively. For example, the object information includes: an image in which the target object is displayed after being cropped and enlarged; information on color and shape of the target object; a time-point and period at which the target object is imaged; an identifier (frame number) of the video frame 14 including the target object; and an identifier of the camera 10 imaging the target object. In addition, information on a size of the target object may be additionally presented. The size of the object can be estimated by converting the image region of the object into a real-space using calibration information of the camera. The information indicating the size of the target object is useful for determining the risk when the target object is a dangerous substance such as a bomb.

Note that, a presentation destination of the image near the estimated left-behind time-point controlled by the above described image presentation method is arbitrary. For example, the presentation destination of the image is a display device of a terminal used by a monitor who monitors the video data 12 of the camera 10 in a security room. In addition, for example, the presentation destination of the image near the estimated left-behind time-point is a display device of a terminal used by a security guard who is guarding at the site. In addition, for example, the presentation destination of the image near the estimated left-behind time-point may be a display device of a terminal used in a predetermined organization such as a security company or the police.

Second Example Embodiment

<Outline>

Described is a method of detecting an object being left, specifically detecting a stationary object from video data and treating the stationary object as a left-behind object as described the first example embodiment. However, a stationary object is not necessarily limited to a left-behind object. Therefore, in a case where a stationary object is detected from the video data, person detection is further performed to determine whether or not the detected stationary object is a left-behind object.

For example, it is assumed that the target object detected as a stationary object is not an object being left but an object placed by the owner. In this case, a state in which the owner stays in the vicinity of the target object continues. On the other hand, in a case where the target object is an object being left, the owner disappears from the vicinity of the target object. Therefore, in order to distinguish the cases, the left-behind object detection unit 2120 performs person detection processing of detecting a person being in the vicinity of the target object with respect to the video frame 14 including the target object at each different time-point, and then a result is compared. In this way, comparing with the method of detecting a stationary object as the left-behind object, it is possible to accurately detect the left-behind object.

Figure 6:
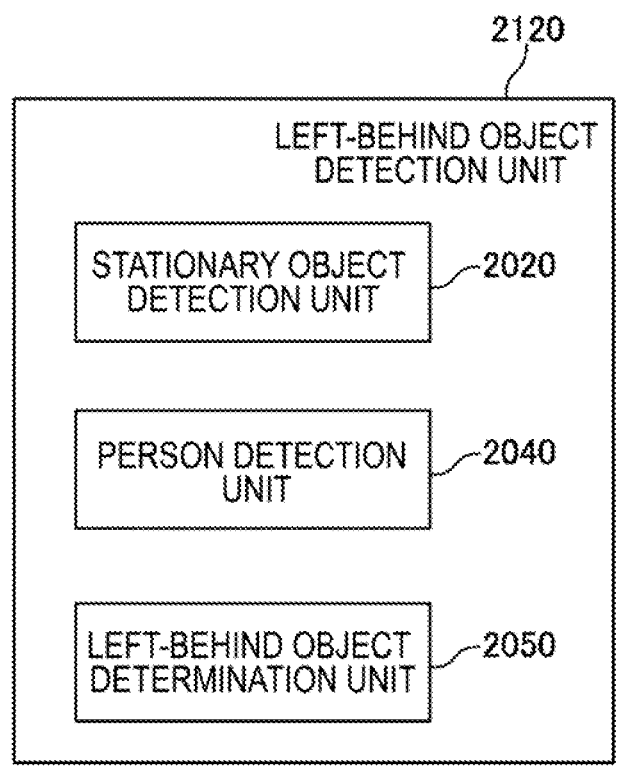
FIG. 6 is a diagram illustrating a configuration of a left-behind object detection unit according to a second example embodiment.

FIG. 6 is a diagram illustrating an outline of a configuration of the left-behind object detection unit 2120 of the present example embodiment. The left-behind object detection unit 2120 includes a stationary object detection unit 2020, a person detection unit 2040, and a left-behind object determination unit 2050. The stationary object detection unit 2020 detects a stationary object from the video data 12 in the same manner as described in the first example embodiment. The person detection unit 2040 executes person detection processing of detecting a person in the vicinity of the target object for each of a plurality of video frames 14 which includes an object (target object) detected as the stationary object. The left-behind object determination unit 2050 executes left-behind determination processing of determining whether or not the detected stationary object is a left-behind object from the result of stationary object detection processing and the result of person detection processing.

<Flow of Processing>

Figure 7:
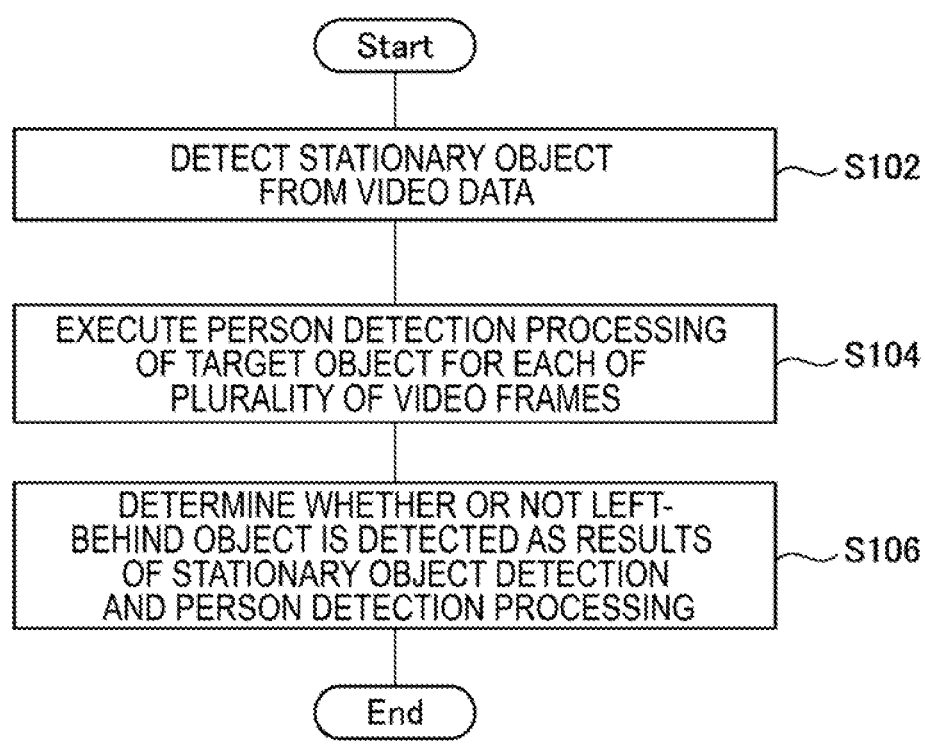
FIG. 7 is a flowchart illustrating a flow of a process executed by the left-behind object detection unit according to the second example embodiment.

FIG. 7 is a flowchart illustrating an example of a process flow of the left-behind object detection unit 2120. The stationary object detection unit 2020 detects the stationary object from the video data 12 (S102). The person detection unit 2040 executes the person detection processing of detecting a person in the vicinity of the target object for each of the plurality of video frames 14 which includes the target object (S104). The left-behind object determination unit 2050 determines whether or not the detected object is the left-behind object by comparing the results of the person detection processing for each of the plurality of video frames (S106).

<Detection of Stationary Object: S102>

The stationary object detection unit 2020 detects the stationary object from the video data 12 (S102). Conventional techniques can be used as the technique for detecting the stationary object from the video data 12. For example, the left-behind object detection (S110) technique described in the first example embodiment can be used.

<Person Detection Processing: S104>

The person detection unit 2040 executes the person detection processing of detecting the person in the vicinity of the target object for each of the plurality of video frames 14 which includes the target object (the object detected as the stationary object) (S104). Hereinafter, in the video frame 14, an image region around the target object is referred to as a vicinity region. For example, in the example of FIG. 5 described above, "the plurality of video frames 14 which include the target objects" are respective video frames 14 generated after the time-point t. The video frames 14 include the object 20 which is the object detected as the stationary object.

Conventional technique (for example, feature value matching, template matching, and the like) can be used as a method of detecting a person from a video frame (that is, image data). For example, in a case of using the feature value matching, the person detection unit 2040 detects a person by detecting an image region which has a feature value that represents features of personal appearance from the video frame 14.

The person detection processing may be processing of detecting an image region representing the entirety of a person, or may be processing of detecting an image region representing a part of a person (for example, the head). Here, in a case where many people or objects are included in an imaging range of the camera 10, there is a high probability that a part of the person is hidden by another person or object. In this case, the head may be a part having a low probability of being hidden by another person or the like (a part having a high probability of being imaged by the camera 10) compared to the lower body and the like. In addition, the head may be a part well representing the features of an individual. Therefore, there are advantages in performing the processing of detecting the head in the person detection processing as follows: 1) the probability capable of detecting the person from the video frame 14 is high; and 2) the person can be detected in a manner of being easily distinguished from other people.

The vicinity region may be an image region of the entirety of the video frame 14 or may be an image region of a part of the video frame 14. In a case where the image region of a part of the video frame 14 is set to the vicinity region, for example, an image region having a predetermined shape based on the position of the target object is the vicinity region. Here, the position of the object can be set to an optional position (for example, a center position) included in the image region representing the object. Furthermore, the predetermined shape can be, for example, a circle or a rectangle having a predetermined size. The vicinity region may or may not include the target object. Information defining the predetermined shape may be set in advance in the person detection unit 2040 or may be stored in a storage device accessible via the person detection unit 2040.

Figure 8A:
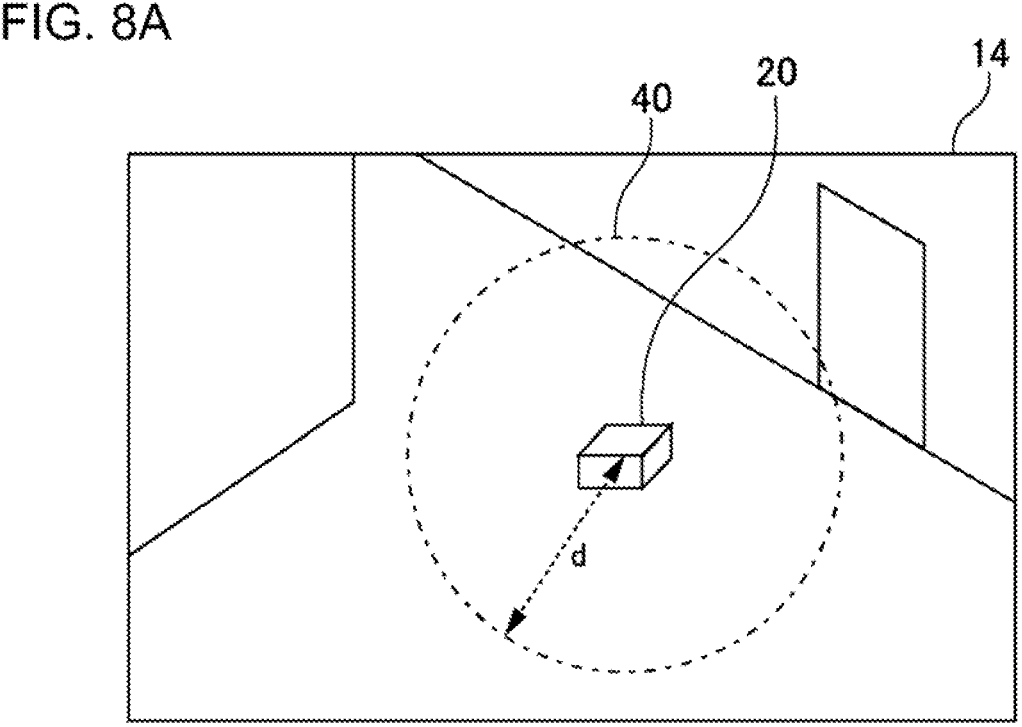
FIGS. 8A and 8B are diagrams illustrating a vicinity region defined as an image region of a part of a video frame.
Figure 8B:
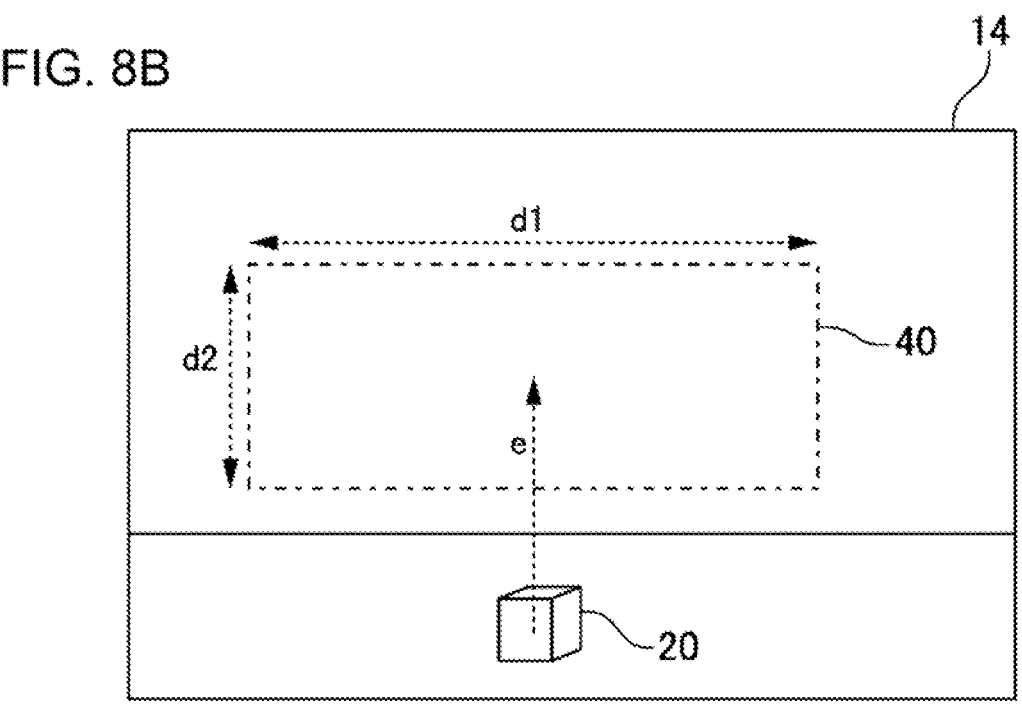

FIG. 8 are diagrams illustrating a vicinity region defined as an image region of a part of a video frame 14. In FIG. 8, the target object is an object 20. In FIG. 8A, a predetermined shape is a circle of radius d. A center position of the vicinity region 40 is a center position of the object 20. In FIG. 8B, the predetermined shape is a rectangle having a long side d1 and a short side d2. In addition, the center position of the vicinity region 40 is a position distant from the center position of the object 20 toward an upper direction as a predetermined distance e.

Note that, according to the position of the vicinity region 40 in the image, the predetermined shape which defines the vicinity region 40 may be changed. For example, a size of the predetermined shape is defined larger in a place closer to the camera 10, and a size of the camera 10 is defined smaller in a place farther from the camera 10. In addition, for example, the predetermined shape is defined such that a size of the vicinity region 40 in a real-space is constant. Here, the size of the vicinity region 40 in the real-space can be estimated using calibration information of the camera 10. Note that, the calibration information of the camera 10 includes information of various parameters (positions and poses of the camera, lens distortions, or the like) required to convert coordinates on the camera 10 into coordinates on the real-space. Well-known techniques can be used to generate calibration information.

<<Video Frame 14 to be subject to Person Detection Processing>>

The person detection unit 2040 executes the person detection processing for at least two video frames 14 among the plurality of video frames 14 including the target object. Hereinafter, the two video frames 14 will be referred to as a first video frame and a second video frame. The second video frame is a video frame 14 generated after the generation of the first video frame. Hereinafter, a method of defining the video frame 14 to be regarded as the first video frame and the second video frame will be described.

In a case where an object is left in a place by a person, the person exists in the vicinity of the object at least until the object is placed in the place. On the other hand, a while after the object is left, there is a high probability that the person does not exist in the vicinity of the object. Therefore, in a case where the person, who exists in the vicinity of the target object near or before a time-point at which the target object is left, does not exist in the vicinity of the target object a while after the target object is left, it can be presumed that the target object is left.

Therefore, for example, a video frame 14 generated at or near the start time-point of the above-described stationary determination period (the time-point before or after the predetermined time) can be adopted as the first video frame. For example, in the example of FIG. 5, the start time-point of the stationary determination period is the time-point t+a. Therefore, assuming that the video frame 14 generated at the start time-point of the stationary determination period is the first video frame, the video frame 14-2 is the first video frame.

In addition, for example, the first video frame may be determined based on the time-point when the target object extracted at the end time-point t+a+p of the stationary determination period is actually left (hereinafter, referred to as a time-point of the object left behind). This is because the time-point (the start time-point of the stationary determination period) when the determination for which the target object is being stationary is started is not always coincided with the time-point when the target object is actually placed in a case where a place where people come and go is imaged by the camera 10.

For this reason, the person detection unit 2040 estimates the time-point of the target object left behind. For example, the person detection unit 2040 extracts an image feature value of the target object from the video frame 14 generated at the end time-point t+a+p of the stationary determination period, and then it is retroactively examined whether the feature value is detected at the same position in each video frame 14 generated before the time-point t+a+p. Then, the person detection unit 2040 estimates that the time-point at which the image feature value of the target object is not detected is, for example, a estimated left-behind time-point. The first video frame determined based on the time-point of the object left behind is, for example, a video frame 14 generated at the time-point of the object left behind or a video frame 14 generated before or after a predetermined time from the time-point of the object left behind.

In addition, for example, the video frame 14 (the video frame 14 in which the target object appears) having the earliest generation time-point among the video frames 14 including the target object can be adopted in the first video frame. For example, in the example of FIG. 5, the video frame 14 in which the target object appears is the video frame 14-1.

In addition, for example, the first video frame may adopt a video frame 14 generated before a predetermined time-point with respect to a generation time-point of the second video frame.

On the other hand, for example, the video frame 14 generated at or near the end time-point of the above described stationary determination period (the time-point before or after the predetermined time-point) can be adopted as the second video frame. In the example of FIG. 5, the end time-point of the stationary determination period is t+a+p. Therefore, assuming that the video frame 14 generated at the end time-point of the stationary determination period is the second video frame, the video frame 14-3 is the second video frame. In addition, for example, the second video frame may adopt a video frame 14 generated after the predetermined time-point with respect to a generation time-point of the first video frame.

The person detection unit 2040 may cause another video frame 14 in addition to the first video frame and the second video frame described above to be subject to the person detection processing. For example, in a case where the person included in the first video frame crouches down, there is a possibility that the person cannot be detected due to the change of the pose although the person is included in the first video frame. Therefore, for example, the person detection unit 2040 also causes a plurality of video frames 14 which are generated at a predetermined time before and after the generation time-point of the first video frame to be subject to the person detection processing. Similarly, the person detection unit 2040 also causes a plurality of video frames 14 which are generated at a predetermined time before and after the generation time-point of the second video frame to be subject to the person detection processing.

<Execution of Left-behind Object Determination Processing: S106>

The left-behind object determination unit 2050 determines whether or not the detected stationary object is the left-behind object by comparing the results of the person detection processing for each of the plurality of video frames 14 including the target object (S106).

Figure 9:
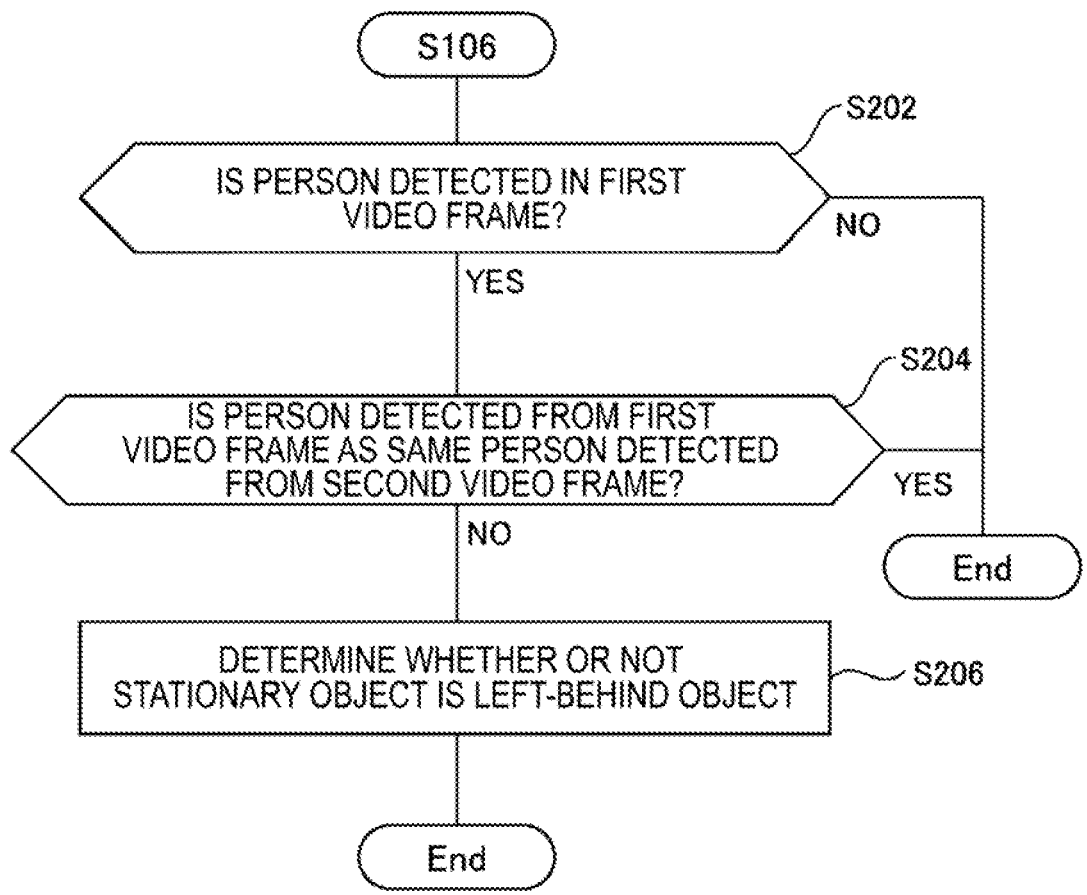
FIG. 9 is a diagram illustrating a flow of left-behind object determination processing executed by a left-behind object determination unit.

FIG. 9 is a diagram illustrating a flow of left-behind object determination processing executed by the left-behind object determination unit 2050. In the example, the left-behind object determination unit 2050 compares the person detection result for the first video frame with the person detection result for the second video frame.

First, the left-behind object determination unit 2050 determines whether a person is detected by person detection processing for the first video frame (S202). In a case where no person is detected, the processing in FIG. 9 ends (the object is not determined to be left behind). The case where a person in the vicinity of the target object is not detected in the first video frame is, for example, a case where the target object suddenly appears within the imaging range of the camera 10 instead of moving from outside the imaging range of the camera 10. For example, it is assumed that the target object is an object (such as a signboard or a bronze statue) fixed and installed at a position within the imaging range of the camera 10. In this case, in a case where the target object is hidden by another object (for example, a machine such as a car), the target object is not imaged by the camera 10. However, when the object hiding the target object moves, the target object is imaged by the camera 10. That is, from the viewpoint of the camera 10, the target object suddenly appears. In addition, for example, there is a case where a difference with the background image is generated due to change of environmental light so that the target object is detected as if the object suddenly appears in the video data 12. In the cases, there is a high probability that the target object is not being left. Therefore, the left-behind object determination unit 2050 does not determine that the target object is being left behind.

In a case where a person is detected in the person detection processing for the first video frame (S202: YES), a feature value (the feature value of a part of a person such as face or head, or the feature value of the person's clothes or belongings) required to person matching is extracted from a region (person region) where the person is detected, and thereafter the processing in FIG. 9 proceeds to S204. In S204, the left-behind object determination unit 2050 determines whether or not the person detection processing for the second video frame detects the same person as a person detected by the person detection processing for the first video frame. In this case, feature values required to person matching are extracted from the person region, if the person is detected from the first video frame. Then, in a case where the similarity between the feature value extracted from the first video frame and the feature value extracted from the second video frame is higher than a predetermined threshold, the left-behind object determination unit 2050 determines that the same person is detected from the video frames.

In a case where the same person is detected (S204: YES), the processing in FIG. 9 ends (the target object is not determined as a left-behind object). In this case, the same person exists in the vicinity of the target object at the generation time-point of the first video frame and the generation time-point of the second video frame. That is, in the above case, the person who places the target object keeps staying in the vicinity thereof, and there is a high probability that the target object is not being left. Therefore, the left-behind object determination unit 2050 does not determine that the target object is being left behind.

On the other hand, in a case where the person detection processing for the second video frame does not detect the same person as a person detected by the person detection processing for the first video frame (S204: NO), the left-behind object determination unit 2050 determines the target object as the left-behind object (S206). The above case is a case where 1) the person is not detected by the person detection processing for the second video frame, or 2) the person detected by the person detection processing for the second video frame is different from the person detected by the person detection processing for the first video frame. In any case, the person who places the target object does not exist in the vicinity of the target object, and there is a high probability that the target object is left behind. Thus, the left-behind object determination unit 2050 determines that the target object is a left-behind object.

Note that, it is considered that a plurality of people is detected from the first video frame and the second video frame. In this case, for example, in a case where any one of the plurality of people detected from the first video frame is the same as any one of the plurality of people detected from the second video frame, the left-behind object determination unit 2050 determines that "the person detection processing for the second video frame detects the same person as a person detected by the person detection processing for the first video frame". On the other hand, in a case where all the persons detected from the first video frame are different from any one of the plurality of people detected from the second video frame, the left-behind object determination unit 2050 determines that "the person detection processing for the second video frame does not detect the same person as a person detected by the person detection processing for the first video frame".

In addition, for example, the left-behind object determination unit 2050 determines that a person (owner of the left-behind object) has a high probability of leaving the target object behind for each of the plurality of people detected from the first video frame, and determines that the person is the same person using the determined result. For example, the left-behind object determination unit 2050 computes, for each person detected from the first video frame, the likelihood of the owner according to the distance between the detection position and the target object. That is, as the distance between the detection position of the person and the target object is small, the likelihood of the person is increased. In this case, the distance between the detection position of the person and the target object may be a distance on the video frame 14 or may be a distance in the real-space. The distance in the real-space can be estimated using calibration information of the camera 10. Then, for example, in a case where any one of the persons who has a likelihood equal to or greater than the predetermined value among the persons detected from the first video frame is also detected from the second video frame, the left-behind object determination unit 2050 determines that "the person detection processing for the second video frame detects the same person as a person detected by the person detection processing for the first video frame".

In the above-described example, although the person detection result for the first video frame is compared with the person detection result for the second video frame, the left-behind object determination unit 2050 does not necessarily have to compare them. For example, instead of the result of the person detection processing for the first video frame, the result of the person detection processing for any video frame 14 generated between a predetermined time-point before the generation time-point of the first video frame and a predetermined time-point after the generation time-point of the first video frame may be used. For example, it is assumed that as a result of performing the person detection processing for the first video frame and each of the plurality of video frames 14 generated between a predetermined time-point before the generation time-point of the first video frame and a predetermined time-point after the generation time-point of the first video frame, the same person is detected from any of the plurality of video frames 14. In this case, the left-behind object determination unit 2050 uses the person detection processing result in which the person is most clearly detected. The above is applied to the second video frame as well.

The left-behind object determination unit 2050 may determine that the target object is a left-behind object by comparing three or more video frames 14. For example, the person detection unit 2040 also performs the person detection processing on one or more video frames 14 generated between the first video frame and the second video frame. Hereinafter, the video frame 14 generated between the first video frame and the second video frame is referred to as an intermediate video frame. Then, the left-behind object determination unit 2050 determines that the target object is a left-behind object based on the result of the person detection processing for each of the first video frame, the second video frame, and one or more intermediate video frames. In this way, the determination whether the person who places the target object keeps staying in the vicinity thereof is more accurately performed.

For example, instead of the determination in S204 described above, the left-behind object determination unit 2050 determines whether the same person as a person detected from the first video frame is detected from one or more intermediate video frames in addition to the second video frame. Then, for example, the left-behind object determination unit 2050 determines that the target object is a left-behind object in a case where the same person as a person detected from the first video frame is not detected in a video frame 14 between the second video frame and the intermediate image frame. On the other hand, the left-behind object determination unit 2050 does not determine that the target object is being left behind in a case where the same person as a person detected from the first video frame is detected in the second video frame and all the intermediate video frames. Note that, the person detected from the first video frame may not necessarily be detected from all the intermediate video frames. For example, the left-behind object determination unit 2050 may not determine the target object as the left-behind object in a case where the same person as a person detected from the first video frame is detected from the intermediate video frame of a predetermined ratio or more.

In addition, for example, the left-behind object determination unit 2050 firstly determines whether a person detected from the first video frame and a person detected from the second video frame are the same, and then only in a case where the determination is not sufficiently accurate, the intermediate video frames may be used. For example, it is assumed that the left-behind object determination unit 2050 determines that the persons are identical based on the similarity between the feature value of the person detected from the first video frame and the feature value of the person detected from the second video frame. In this case, for example, the left-behind object determination unit 2050 determines that 1) the detected person is the same in a case where a similarity is equal to or more than a first predetermined value, 2) the detected person is not the same in a case where a similarity is less than a second predetermined value (this value less than the first predetermined value), and 3) the determination accuracy is not sufficient in a case where a similarity is equal to or more than the second predetermined value and less than the first predetermined value. In the case of 3), the left-behind object determination unit 2050 further determines whether the person detected from the first video frame is detected from the intermediate video frames.

In addition, for example, the left-behind object determination unit 2050 may estimate a type of the object being left behind. This is because handling in a case where an object being left behind is detected differs depending on what the left-behind object is. For example, in a case where the object being left behind is a cart for carrying luggage or a notice board (for example, a board written with caution) that is placed on the floor for calling attention, their existence does not cause any major problem. Therefore, it is not necessary to detect the object as a left-behind object. In such a case, the left-behind object determination unit 2050 may not determine the object as a left-behind object.

The operation of the left-behind object detection unit 2120 is described above, and the operation of the left-behind time-point estimation unit 2140 in the second example embodiment is the same as in the first example embodiment. The presentation control unit 2160 is basically the same as in the first example embodiment. However, in order to allow the situation to be easily visually confirmed, the presentation control unit 2160 may also present information related to the person who is presumed to have left the target object (hereinafter, person information) on the screen, based on the person detection result. Note that, a person who is presumed to have left the target object is a person who is detected from the vicinity of the target object in the first video frame and is not detected from the vicinity of the target object in the second video frame.

For example, in a case of presenting an image, the presentation control unit 2160 may display a region of a person who is considered to be the owner of the target object by enclosing the target object with a frame. That is, the presentation control unit 2160 may present the region of the person who is determined to have a high likelihood to be the owner of the target object by the left-behind object determination unit 2050 so that the region is enclosed by a frame. In this case, only a person who is determined to have the highest likelihood may be displayed to be enclosed by a frame, or a person who has a likelihood equal to or greater than a certain possibility may be enclosed by a frame. In a case of providing the plurality of people enclosed by a frame, according to the likelihood, difference of the likelihood may be presented to be understood by changing color and thickness of the frame, or displaying a likelihood value directly together with the frame. Note that, in a case where a position of the target person is obtained before and after the first video frame by tracking processing described later, the person frame may also be presented even in the obtained frame.

In addition, the presentation control unit 2160 may present information other than the information described above as the person information. For example, the person information includes an image and feature values of the person who is presumed to have left the target object, a time-point when the person enters the imaging range of the camera 10 (arrival time-point), and a time-point when the person goes out of the imaging range of the camera 10 (departure time-point). Here, the arrival time-point and the departure time-point can be estimated by, for example, performing tracking processing of a person using the plurality of video frames 14 generated before and after the video frame 14 in which the person who is presumed to have left the target object is detected, and determining the time-point when the person moved from the place where the target object is left behind. In addition, for example, the arrival time-point or the departure time-point may be estimated based on the time-point when the person disappears from the imaging range of the camera 10. Note that, a known method can be used for the person tracking processing. Note that, the movement velocity of the person may be determined by the tracking processing, and the movement velocity may be included in the person. The moving velocity of a person estimated to have left the target object can be used for, for example, predicting the appearance time-point of the person in other cameras in the vicinity.

In addition, in a case where the person who is presumed to have left the target object is included in other person relation information such as a blacklist, the person information may include the information of the person indicated in the "other information".

In the above description, a case of detecting the object left behind has been described, but the technique of detecting the object left behind can also be applied to graffiti detection and carrying away detection. Accordingly, the above-described technique can also be used in a case of presenting a person who is drawing graffiti or a situation of a person who has carried the target object away by using video data.

Hereinabove, although the example embodiments of the present invention are described with reference to the accompanying drawings, the example embodiments are examples of the present invention, and it is possible to employ configurations of combining the respective example embodiments or various configurations other than the example embodiments.

Some or all of the above example embodiments may be described as in the following description, but it is not limited thereto.

1. An information processing apparatus comprising:
a left-behind object detection unit detecting a left-behind object from video data;
a left-behind time-point estimation unit estimating a left-behind time-point at which the left-behind object is placed; and
a presentation control unit acquiring video data near the estimated left-behind time-point, and presenting at least a part of the acquired video data by controlling a method of presenting the acquired video data based on the estimated left-behind time-point.

2. The information processing apparatus according to 1, wherein the left-behind object detection unit includes:

a person detection unit executing person detection processing of detecting a person in the vicinity of a target object for each of a first video frame and a second video frame, the target object being an object detected as a stationary object, the first video frame including the target object, the second video frame including the target object and being generated after the first video frame; and a left-behind state determination unit determining a left-behind state by comparing results of the person detection processing for each of the first video frame and the second video frame, and wherein it is determined that the left-behind object is detected in a case where the object is determined to be in a state of being left behind by the left-behind state determination unit.

3. The information processing apparatus according to 1 or 2, wherein the presentation control unit determines a playback speed of each of a plurality of parts included in the acquired video data based on the estimated left-behind time-point.

4. The information processing apparatus according to 3, wherein the presentation control unit performs a playback for the acquired video data in a reverse direction and causes the playback speed of the part near the estimated left-behind time-point in the acquired video data to be slower than a playback speed of another part.

5. The information processing apparatus according to 1 or 2, wherein the presentation control unit extracts one or more video frames included in the acquired video data and displays the extracted video frames side by side, and the number of video frames extracted from each of a plurality of parts in the acquired video data is determined based on the estimated left-behind time-point.

6. The information processing apparatus according to 1 or 2, wherein the presentation control unit extracts one or more video frames included in the acquired video data and switches and displays the extracted video frames sequentially, and the number of video frames extracted from each of a plurality of parts in the acquired video data per unit time is determined based on the estimated left-behind time-point.

7. The information processing apparatus according to 6, wherein the presentation control unit displays the extracted video frames in an order from a latest generation time-point.

8. The information processing apparatus according to any one of 5 to 7, wherein the presentation control unit sets the number of video frames extracted from the video data near the estimated left-behind time-point per unit time to be greater than the number of video frames extracted from video data in another period per unit time.

9. The information processing apparatus according to any one of 1 to 8, wherein the presentation control unit provides information on the detected left-behind object together with at least a part of the acquired video data.

10. A control method causing a computer to execute:

a left-behind object detection step of detecting a left-behind object from video data;

a left-behind time estimation step of estimating a left-behind time-point at which the left-behind object is placed; and a presentation control step of acquiring video data near the estimated left-behind time-point, and presenting at least part of the acquired video data by controlling a method of presenting the acquired video data based on the estimated left-behind time-point.

11. The control method according to 10, wherein the left-behind object detection step includes:

a person detection step of executing person detection processing of detecting a person in the vicinity of a target object for each of a first video frame and a second video frame, the target object being an object detected as a stationary object, the first video frame including the target object, the second video frame including the target object and being generated after the first video frame; and a left-behind state determination step of determining a left-behind state by comparing results of the person detection processing for each of the first video frame and the second video frame, and wherein it is determined that the left-behind object is detected in a case where the object is determined to be in a state of being left behind in the left-behind state determination step.

12. The control method according to 10 or 11, wherein in the presentation control step, a playback speed of each of a plurality of parts included in the acquired video data is determined based on the estimated left-behind time-point.

13. The control method according to 12, wherein in the presentation control step, a playback for the acquired video data is performed in a reverse direction and the playback speed of the part near the estimated left-behind time-point in the acquired video data is slower than a playback speed of another part.

14. The control method according to 10 or 11, wherein in the presentation control step, one or more video frames included in the acquired video data are extracted and the extracted video frames are displayed side by side, and the number of video frames extracted from each of a plurality of parts in the acquired video data is determined based on the estimated left-behind time-point.

15. The control method according to 10 or 11, wherein in the presentation control step, one or more video frames included in the acquired video data are extracted and the extracted video frames are switched and displayed sequentially, and the number of video frames extracted from each of a plurality of parts in the acquired video data per unit time is determined based on the estimated left-behind time-point.

16. The control method according to 15, wherein in the presentation control step, the extracted video frames are displayed in an order from a latest generation time-point.

17. The control method according to any one of 14 to 16, wherein in the presentation control step, the number of video frames extracted from the video data near the estimated left-behind time-point per unit time is set to be greater than the number of video frames extracted from video data in another period per unit time.

18. The control method according to any one of 10 to 17, wherein in the presentation control step, information on the detected left-behind object is provided together with at least a part of the acquired video data.

19. A program causing a computer to execute each step of the control method according to any one of 10 to 18.

The invention claimed is:
1. An information processing apparatus comprising:
at least one of a circuit and a processor configured to execute:
a left-behind object detection unit detecting a left-behind object from video data;

a left-behind time-point estimation unit estimating a left-behind time-point at which the left-behind object is placed; and a presentation control unit acquiring video data near the estimated left-behind time-point, and presenting at least a part of the acquired video data by controlling a method of presenting the acquired video data based on the estimated left-behind time-point, wherein the presentation control unit extracts one or more video frames included in the acquired video data and displays the extracted video frames side by side, and wherein the number of video frames extracted from each of a plurality of parts in the acquired video data is determined based on the estimated left-behind time-point.

2. The information processing apparatus according to claim 1, wherein the left-behind object detection unit includes:

a person detection unit executing person detection processing of detecting a person in the vicinity of a target object for each of a first video frame and a second video frame, the target object being an object detected as a stationary object, the first video frame including the target object, the second video frame including the target object and being generated after the first video frame; and a left-behind state determination unit determining a left-behind state by comparing results of the person detection processing for each of the first video frame and the second video frame, and wherein it is determined that the left-behind object is detected in a case where the object is determined to be in a state of being left behind by the left-behind state determination unit.

3. The information processing apparatus according to claim 1, wherein the presentation control unit determines a playback speed of each of a plurality of parts included in the acquired video data based on the estimated left-behind time-point.

4. The information processing apparatus according to claim 3, wherein the presentation control unit performs a playback for the acquired video data in a reverse direction and causes the playback speed of the part near the estimated left-behind time-point in the acquired video data to be slower than a playback speed of another part.

5. The information processing apparatus according to claim 1, wherein the presentation control unit sets the number of video frames extracted from the video data near the estimated left-behind time-point per unit time to be greater than the number of video frames extracted from video data in another period per unit time.

6. The information processing apparatus according to claim 1, wherein the presentation control unit presents information on the detected left-behind object together with at least a part of the acquired video data.

7. An information processing apparatus comprising:

at least one of a circuit and a processor configured to execute:

a left-behind object detection unit detecting a left-behind object from video data;

a left-behind time-point estimation unit estimating a left-behind time-point at which the left-behind object is placed; and a presentation control unit acquiring video data near the estimated left-behind time-point, and presenting at least a part of the acquired video data by controlling a method of presenting the acquired video data based on the estimated left-behind time-point, wherein the presentation control unit extracts one or more video frames included in the acquired video data and switches and displays the extracted video frames sequentially, and wherein the number of video frames extracted from each of a plurality of parts in the acquired video data per unit time is determined based on the estimated left-behind time-point.

8. The information processing apparatus according to claim 7, wherein the presentation control unit displays the extracted video frames in an order from a latest generation time-point.

9. A control method causing a computer to execute:

detecting a left-behind object from video data;

estimating a left-behind time-point at which the left-behind object is placed; and acquiring video data near the estimated left-behind time-point, and presenting at least part of the acquired video data by controlling a method of presenting the acquired video data based on the estimated left-behind time-point, wherein one or more video frames included in the acquired video data are extracted and the extracted video frames are displayed side by side, and wherein the number of video frames extracted from each of a plurality of parts in the acquired video data is determined based on the estimated left-behind time-point.

10. The control method according to claim 9, further comprising:

executing person detection processing of detecting a person in the vicinity of a target object for each of a first video frame and a second video frame, the target object being an object detected as a stationary object, the first video frame including the target object, the second video frame including the target object and being generated after the first video frame; and determining a left-behind state by comparing results of the person detection processing for each of the first video frame and the second video frame, and wherein it is determined that the left-behind object is detected in a case where the object is determined to be in a state of being left behind.

11. The control method according to claim 9, wherein a playback speed of each of a plurality of parts included in the acquired video data is determined based on the estimated left-behind time-point.

12. The control method according to claim 11, wherein a playback for the acquired video data is performed in a reverse direction and the playback speed of the part near the estimated left-behind time-point in the acquired video data is slower than a playback speed of another part.

13. The control method according to claim 9, wherein the number of video frames extracted from the video data near the estimated left-behind time-point per unit time is set to be greater than the number of video frames extracted from video data in another period per unit time.

14. The control method according to claim 9, wherein information on the detected left-behind object is presented together with at least a part of the acquired video data.

15. A non-transitory computer-readable medium storing a program causing a computer to execute the control method according to claim 9.

16. A control method causing a computer to execute:
    detecting a left-behind object from video data;
    estimating a left-behind time-point at which the left-behind object is placed; and
    acquiring video data near the estimated left-behind time-point, and presenting at least part of the acquired video data by controlling a method of presenting the acquired video data based on the estimated left-behind time-point,
    wherein one or more video frames included in the acquired video data are extracted and the extracted video frames are switched and displayed sequentially, and
    wherein the number of video frames extracted from each of a plurality of parts in the acquired video data per unit time is determined based on the estimated left-behind time-point.

17. The control method according to claim 16, wherein the extracted video frames are displayed in an order from a latest generation time-point.

* * * * *